US009903556B2

(12) United States Patent
Wasilewski et al.

(10) Patent No.: US 9,903,556 B2
(45) Date of Patent: Feb. 27, 2018

(54) LIGHT ASSEMBLY WITH CONCURRENTLY ROTATING MASKS

(71) Applicant: GM GLOBAL TECHNOLOGY OPERATIONS LLC, Detroit, MI (US)

(72) Inventors: Andrzej Wasilewski, Shelby Township, MI (US); Jeffrey T. Zawacki, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 259 days.

(21) Appl. No.: 14/866,019

(22) Filed: Sep. 25, 2015

(65) Prior Publication Data

US 2017/0089538 A1 Mar. 30, 2017

(51) Int. Cl.

| | |
|---|---|
| ***B60Q 1/076*** | (2006.01) |
| ***F21V 1/10*** | (2006.01) |
| ***B60Q 1/14*** | (2006.01) |
| ***F21S 8/10*** | (2006.01) |

(52) U.S. Cl.

CPC ......... *F21S 48/1742* (2013.01); *F21S 48/155* (2013.01); *F21S 48/115* (2013.01); *F21S 48/1258* (2013.01)

(58) Field of Classification Search

CPC .. F21V 1/10; F21V 11/16; F21V 11/18; F21V 11/183; F21V 14/08; F21V 17/02; B60Q 1/06; B60Q 1/076; B60Q 1/1438

See application file for complete search history.

(56) References Cited

U.S. PATENT DOCUMENTS

| | | | | |
|---|---|---|---|---|
| 419,524 A * | 1/1890 | Huber | F21V 17/02 | 362/293 |
| 1,446,899 A * | 2/1923 | Hellroth et al. | B60Q 1/1438 | 362/324 |
| 1,506,238 A * | 8/1924 | Hoefler | B60Q 1/1438 | 362/281 |
| 1,515,371 A * | 11/1924 | Smith | B60Q 1/1438 | 362/283 |
| 1,562,715 A * | 11/1925 | Naylor | B60Q 1/1438 | 362/283 |
| 1,885,419 A * | 11/1932 | Dina | G03B 21/18 | 362/321 |
| 2,321,488 A * | 6/1943 | Hughes | F21V 14/08 | 362/322 |
| 3,548,186 A * | 12/1970 | Brock | F21S 6/002 | 24/30.5 T |
| 4,350,417 A * | 9/1982 | Freeman | G02B 26/02 | 352/198 |
| 4,622,625 A * | 11/1986 | Becker | F21V 14/04 | 362/297 |

(Continued)

*Primary Examiner* — Ismael Negron

(74) *Attorney, Agent, or Firm* — Quinn IP Law

(57) ABSTRACT

A light assembly includes a plurality of light modules attached to a carrier, a stationary bezel attached to the carrier and defining an opening through which light from the light modules passes, first and second masks attached to the carrier for rotation about an axis, and a drive system coupled to and interconnecting the first and second rotating masks, the drive system having a drive gear coupled to the first and second rotating masks, to simultaneously rotate the masks between respective open positions, and closed positions where the masks block light from the light modules from passing through the opening.

20 Claims, 6 Drawing Sheets

(56) References Cited

U.S. PATENT DOCUMENTS

| | | | | |
|---|---|---|---|---|
| 5,053,934 | A * | 10/1991 | Krebs | F21S 8/00<br>353/88 |
| 6,241,366 | B1 * | 6/2001 | Roman | F21V 9/10<br>362/277 |
| 7,832,907 | B2 * | 11/2010 | Kotovsky | F21S 6/007<br>362/283 |

* cited by examiner

LIGHT ASSEMBLY WITH CONCURRENTLY ROTATING MASKS

TECHNICAL FIELD

The disclosure generally relates to a light assembly, and more particularly to a headlamp assembly for a vehicle.

BACKGROUND

Vehicles may include a light assembly disposed near a forward end of the vehicle for illuminating the forward direction of the vehicle. These forward facing light assemblies may be referred to as a headlamp assembly or a headlight. Each light assembly may be equipped with multiple LED light modules used for a high beam function, and multiple LED light modules used for a low beam function. The light assembly is an important part of the aesthetics of the vehicle. Many drivers desire that the light assembly provides a unique and distinctive look to the vehicle.

SUMMARY

A headlamp assembly is provided. The headlamp assembly includes a carrier, and at least one light module attached to the carrier and operable to emit light. A stationary bezel is attached to the carrier. The stationary bezel defines an opening, through which light from at least one light module passes. A first rotating mask is rotatably attached to the carrier for rotation about a rotation axis, relative to the stationary bezel. A second rotating mask is rotatably attached to the carrier for rotation about the rotation axis, relative to the stationary bezel. A drive system is coupled to and interconnects the first rotating mask and the second rotating mask. The drive system is operable to rotate the first rotating mask between an open position and a closed position, and rotate the second rotating mask between an open position and a closed position. The first rotating mask and the second rotating mask are positioned clear of the opening in the stationary bezel when disposed in their respective open positions, to allow light from at least one light module through the opening. The first rotating mask and the second rotating mask are positioned in the opening of the stationary bezel to conceal the light modules when disposed in their respective closed positions.

A light assembly is also provided. The light assembly includes a carrier, and a plurality of light modules that are attached to the carrier. The light modules are operable to emit light, and are stacked relative to each other along a rotation axis. A stationary bezel is attached to the carrier. The stationary bezel defines an opening, through which light from the plurality of light modules passes. A first rotating mask is rotatably attached to the carrier for rotation about the rotation axis, relative to the stationary bezel. A second rotating mask is rotatably attached to the carrier for rotation about the rotation axis, relative to the stationary bezel. A drive system is coupled to and interconnects the first rotating mask and the second rotating mask. The drive system includes a drive gear in meshing engagement with each of the first rotating mask and the second rotating mask. The drive gear is operable to simultaneously rotate the first rotating mask between an open position and a closed position, and the second rotating mask between an open position and a closed position.

Accordingly, the first rotating mask and the second rotating mask may be rotated between their respective open positions to allow light through the opening of the stationary bezel when light is required, and their respective closed positions to conceal the light modules, and provide unique aesthetics to the vehicle when light from the light modules is not required.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims.

Referring to the Figures, wherein like numerals indicate like parts throughout the several views, a light assembly is generally shown at 20. The light assembly 20 may be configured for any suitable use. For example, the light assembly 20 may be configured as a front headlamp for a vehicle, such as shown in the Figures. However, it should be appreciated that the light assembly 20 may be configured for some other application, such as but not limited to a boat, a motorcycle, a streetlight, etc.

Figure 1:
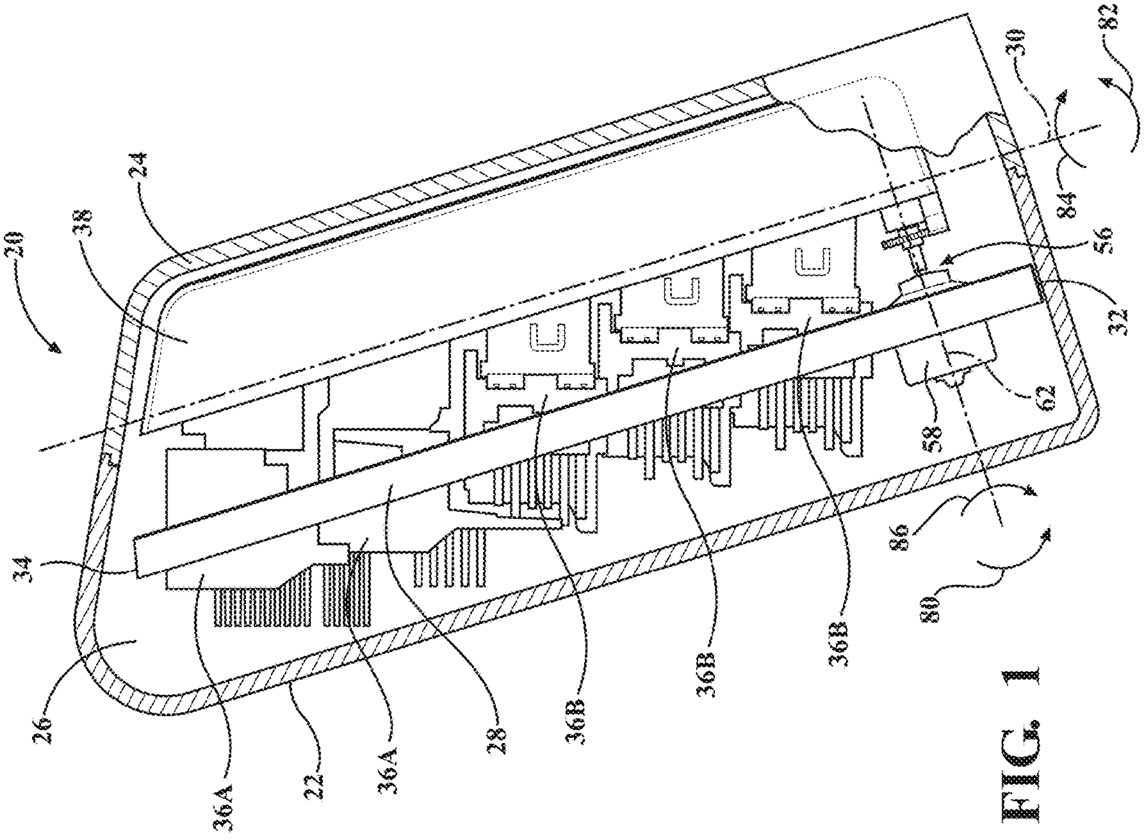
FIG. 1 is a schematic, partially cut away side view from a side of a light assembly.

Referring to FIG. 1, the light assembly 20 includes a housing 22. As shown in the exemplary embodiment of the Figures, the housing 22 is configured for attachment to a body of a vehicle. However, other applications may require that the housing 22 be configured differently than shown herein. The housing 22 is manufactured from a rigid material, such as but not limited to a plastic material. The housing 22 supports the various components of the light assembly 20, and provides a rearward or back cover for the components. A lens 24 is attached to and supported by the housing 22. The lens 24 is manufactured from a clear material, such as but not limited to a polycarbonate material. The lens 24 provides a front cover for the components of the light assembly 20, and allows the light to pass through. The housing 22 and the lens 24 cooperate to define an enclosed interior region 26 therebetween, which encloses the components of the light assembly 20 and protects them from moisture, dirt, and debris.

The light assembly 20 includes a carrier 28. The carrier 28 is attached to and supported by the housing 22. As shown in the Figures, the exemplary embodiment of the light assembly 20 is configured in a generally vertical orientation, such that the carrier 28 extends along a rotation axis 30, between a lower end 32 and an upper end 34. As shown in the exemplary embodiment of the Figures, the upper end 34 of the carrier 28 is disposed at a higher elevation than the lower end 32 of the carrier 28. However, it should be appreciated that the light assembly 20 may be configured in a horizontal arrangement, in which case the upper end 34 and the lower end 32 of the carrier 28 would be disposed at generally the same elevation. The carrier 28 may be attached to the housing 22 in any suitable manner. For example, the carrier 28 may be rotatably attached to the housing 22 to allow for aiming the light assembly 20. Alternatively, the carrier 28 may be fixedly attached to the housing 22, i.e., non-rotatable relative to the housing 22.

The light assembly 20 includes at least one light module 36. Preferably, and as shown, the light assembly 20 includes a plurality of light modules 36 stacked relative to each other along the rotation axis 30. As shown in the Figures, the exemplary embodiment of the light assembly 20 includes at least one low beam light module 36A, and at least one high beam light module 36B. More specifically, the exemplary embodiment includes two low beam light modules 36A and three high beam light modules 36B. Each of the light modules 36 (including the low beam light modules 36A and the high beam light modules 36B shown in the Figures) is attached to the carrier 28, and is operable to emit light. The light modules 36 may be attached to the carrier 28 in any suitable manner. The light modules 36, including both the low beam light modules 36A and the high beam light modules 36B are referred to generally by the reference numeral 36, whereas the low beam light modules 36A are referred to specifically with the reference numeral 36A, and the high beam light modules 36B are referred to specifically by the reference numeral 36B. In the exemplary embodiment, each of the low beam light modules 36A and the high beam light modules 36B include a Light Emitting Diode (LED). However, the low beam light modules 36A and the high beam light modules 36B may each include other types of light producing modules, other than the LED modules described herein.

Figure 2:
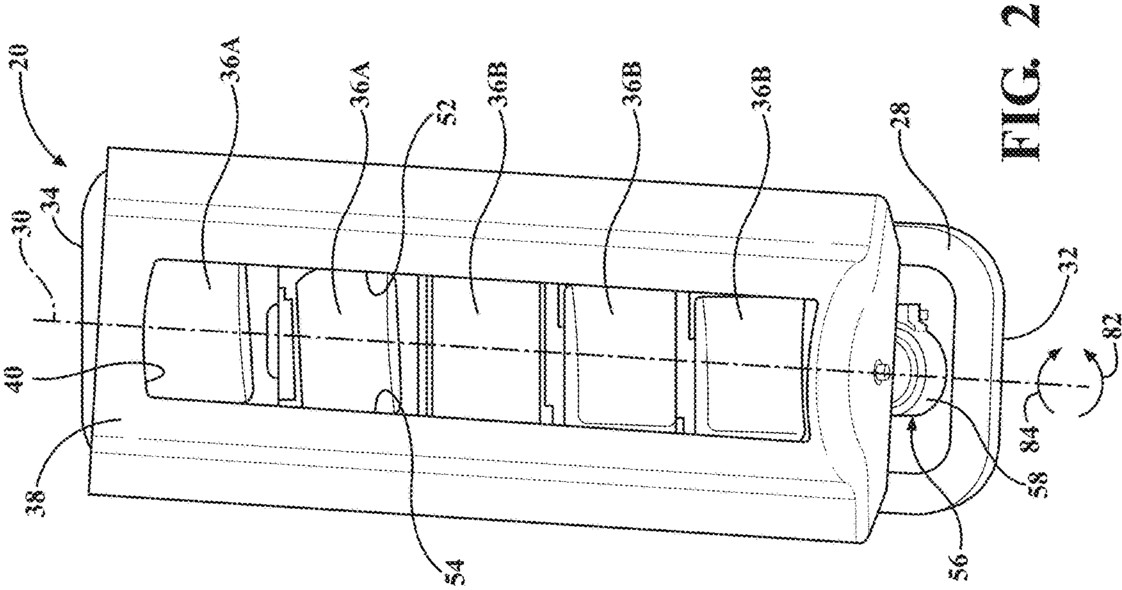
FIG. 2 is a schematic plan view from a front of the light assembly, showing a first rotating mask and a second rotating mask in respective open positions.

Referring to FIG. 2, a stationary bezel 38 is fixedly attached to the carrier 28. The stationary bezel 38 is non-rotatable relative to the carrier 28. The stationary bezel 38 extends along the rotation axis 30, and defines an opening 40 through which light from the light modules 36 passes. The opening 40 is sized to generally frame the light modules 36. Accordingly, the exact size of the opening 40 depends on the number and size of the light modules 36.

Figure 4:
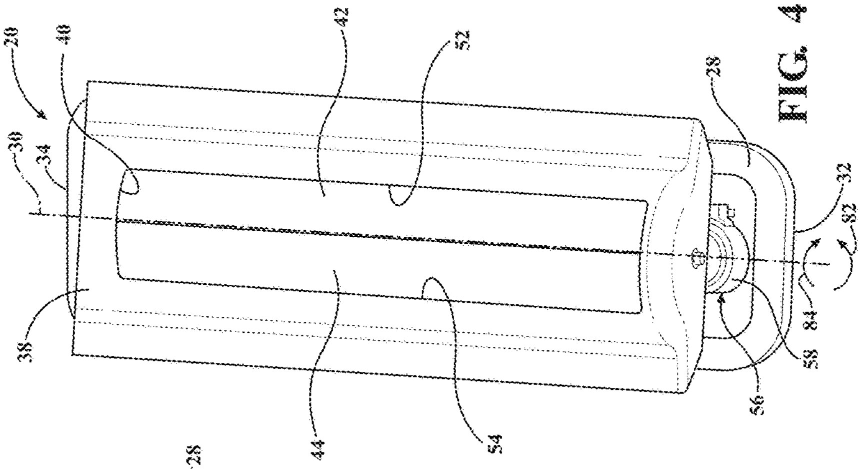
FIG. 4 is a schematic plan view from the front of the light assembly, showing the first rotating mask and the second rotating mask in respective closed positions.
Figure 3:
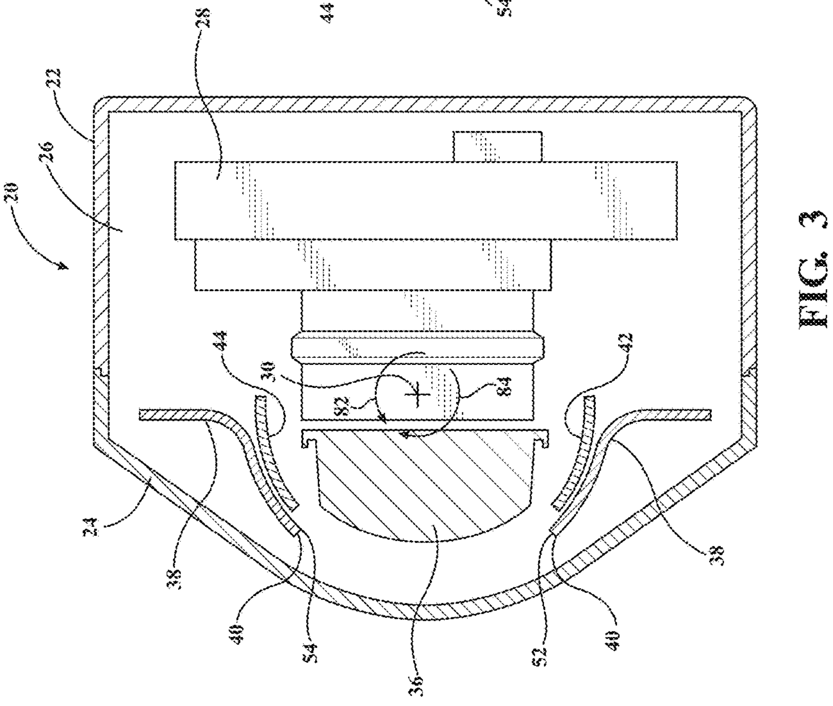
FIG. 3 is a schematic cross sectional view of the light assembly showing the first rotating mask and the second rotating mask in their respective open positions.
Figure 5:
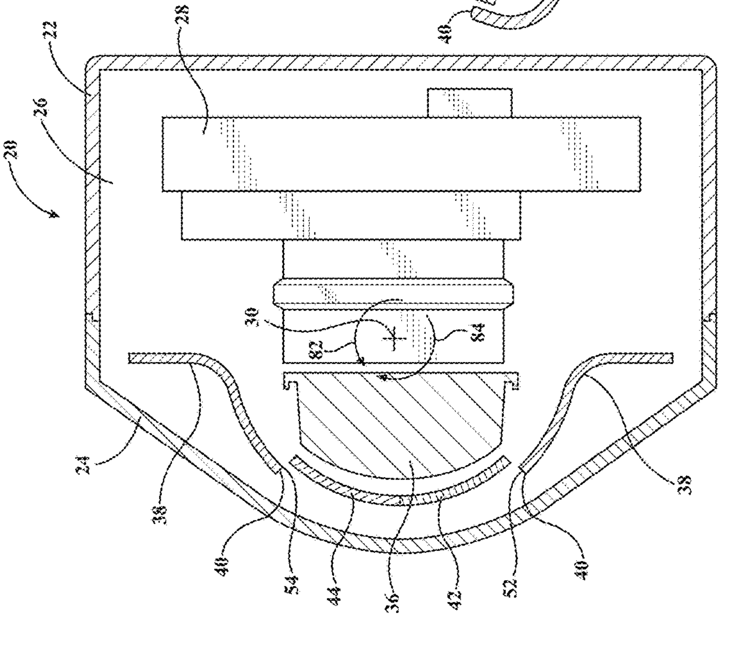
FIG. 5 is a schematic cross sectional view of the light assembly showing the first rotating mask and the second rotating mask in their respective closed positions.
Figure 11:
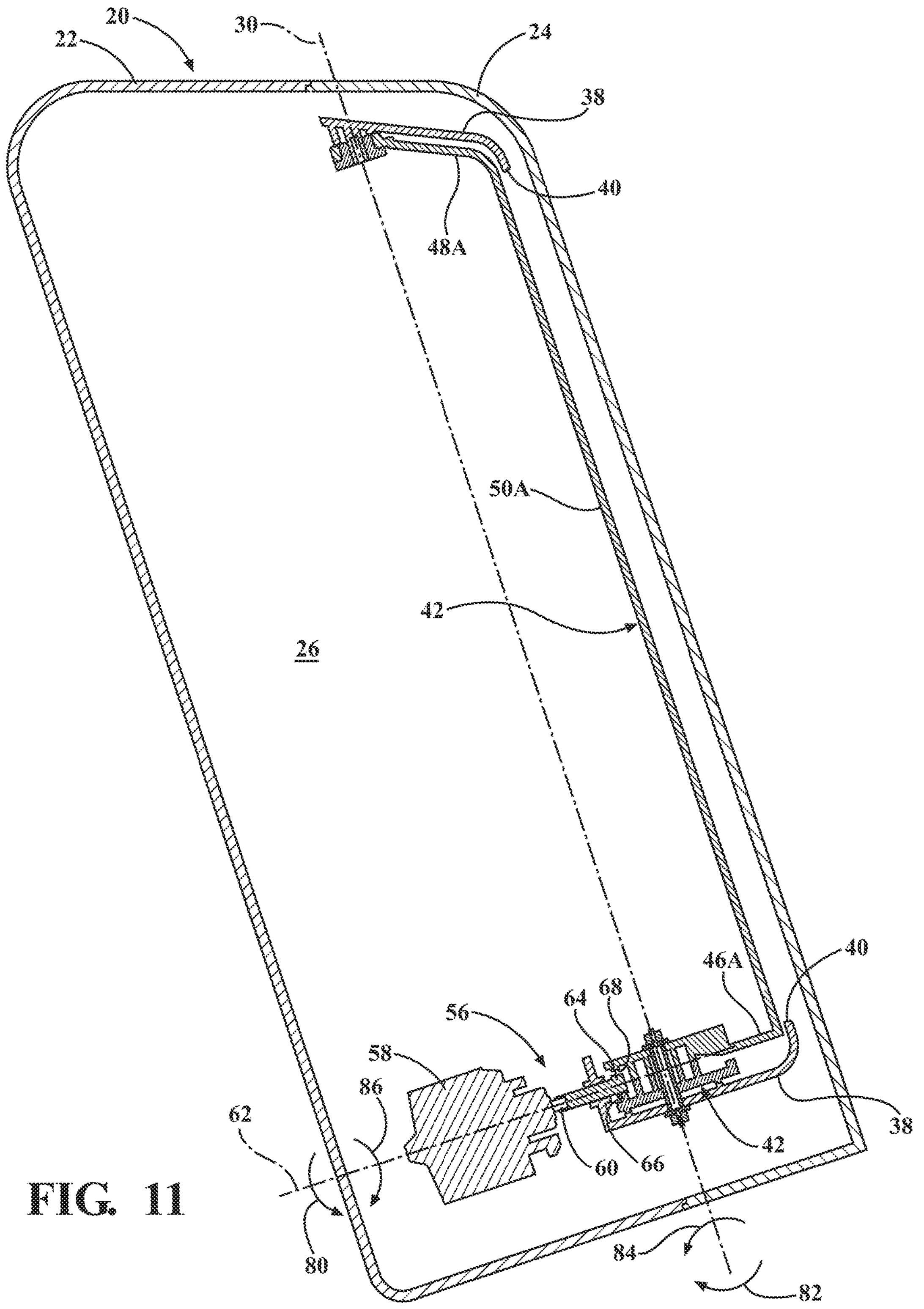
FIG. 11 is a schematic cross sectional view of the light assembly from a second direction.

Referring to FIGS. 3 and 5, the light assembly 20 includes a first rotating mask 42, and a second rotating mask 44. The first rotating mask 42 is rotatably supported for rotation about the rotation axis 30, relative to the stationary bezel 38. Referring to FIG. 11, the first rotating mask 42 includes a lower arm portion 46A, an upper arm portion 48A, and a wall portion 50A. The upper arm portion 48A and the lower arm portion 46A of the first rotating mask 42 each extend generally transverse to and away from the rotation axis 30. The wall portion 50A of the first rotating mask 42 extends between the lower arm portion 46A and the upper arm portion 48A of the first rotating mask 42, generally parallel with the rotation axis 30. The wall portion 50A of the first rotating mask 42 is radially spaced from the rotation axis 30, and is disposed adjacent a first edge 52 of the opening 40 in stationary bezel 38, shown in FIGS. 4 and 5.

Figure 10:
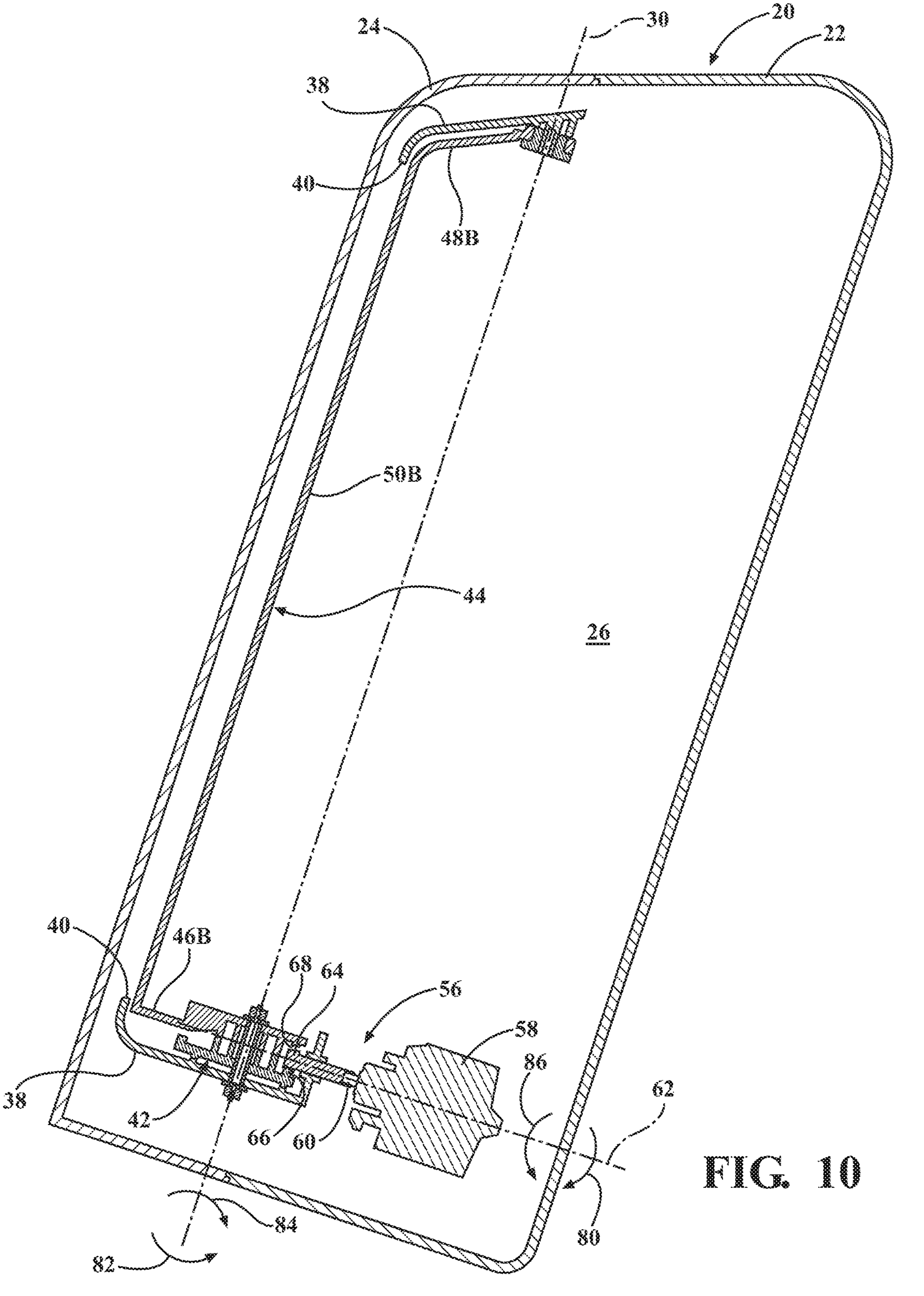
FIG. 10 is a schematic cross sectional view of the light assembly from a first direction.

The second rotating mask 44 is rotatably supported for rotation about the rotation axis 30, relative to the stationary bezel 38. Referring to FIG. 10, the second rotating mask 44 includes a lower arm portion 46B, an upper arm portion 48B, and a wall portion 50B. The upper arm portion 48B and the lower arm portion 46B of the second rotating mask 44 each extend generally transverse to and away from the rotation axis 30. The wall portion 50B of the second rotating mask 44 extends between the lower arm portion 46B and the upper arm portion 48B of the second rotating mask 44, generally parallel with the rotation axis 30. The wall portion 50B of the second rotating mask 44 is radially spaced from the rotation axis 30, and is disposed adjacent a second edge 54 of the opening 40 in stationary bezel 38, shown in FIGS. 4 and 5. The first edge 52 and the second edge 54 of the opening 40 are parallel with each other, are disposed on opposite sides of the opening 40, and extend along and generally parallel with the rotation axis 30.

The light assembly 20 includes a drive system 56 that is coupled to and interconnects the first rotating mask 42 and the second rotating mask 44. The drive system 56 is operable to rotate the first rotating mask 42 between an open position, best shown in FIGS. 2 and 3, and a closed position, best shown in FIGS. 4 and 5, and rotate the second rotating mask 44 between an open position, best shown in FIGS. 2 and 3, and a closed position, best shown in FIGS. 4 and 5. The drive system 56 simultaneously rotates the first rotating mask 42 and the second rotating mask 44 between their respective open positions and closed positions. Accordingly, the drive system 56 simultaneously rotates both the first rotating mask 42 and the second rotating mask 44 into their respective open position, or operates in reverse to simultaneously rotate the first rotating mask 42 and the second rotating mask 44 into their respective closed position.

Referring to FIGS. 2 and 3, the first rotating mask 42 and the second rotating mask 44 are positioned clear of the opening 40 in the stationary bezel 38, when disposed in their respective open positions, to allow light from the light modules 36 to shine through the opening 40. When disposed in their respective open positions, the first rotating mask 42 and the second rotating mask 44 are positioned behind respective sides of the stationary bezel 38, so as to not block the opening 40 in the stationary bezel 38. As shown in FIGS. 3 and 5, in the cross sections perpendicular to the rotation axis 30, each of the stationary bezel 38, the first rotating mask 42 and the second rotating mask 44 include an arcuate cross sectional shape, so that the first rotating mask 42 and the second rotating mask 44 may nestle closely against the stationary bezel 38 when disposed in their respective open positions. Referring to FIGS. 4 and 5, the first rotating mask 42 and the second rotating mask 44 are positioned in the opening 40 of the stationary bezel 38 to conceal the light modules 36 when disposed in their respective closed positions. Accordingly, when the first rotating mask 42 and the second rotating mask 44 are positioned in their respective closed position, the light modules 36 are not visible from the exterior of the light assembly 20.

Figure 7:
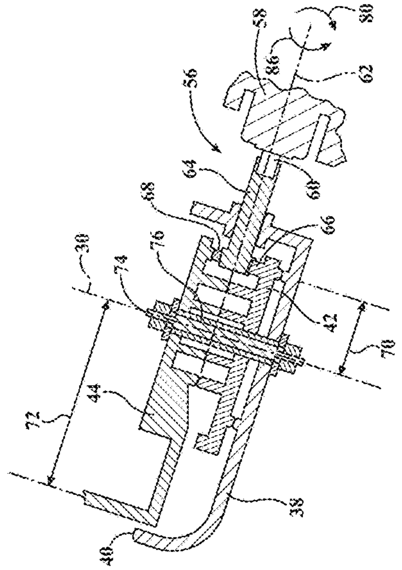
FIG. 7 is a schematic, partial cross sectional view of the light assembly.

Referring to FIG. 7, the drive system 56 includes a motor 58. The motor 58 includes an output 60 that is rotatable about a drive axis 62. The drive axis 62 is substantially perpendicular to the rotation axis 30. Preferably, the motor 58 includes an electric motor. However, it should be appreciated that the motor 58 may include some other device capable of providing a rotational output 60, such as a pneumatic device, a hydraulic device, or a vacuum operated device. A drive gear 64 is attached to the output 60 of the motor 58. The drive gear 64 is rotatably driven by the output 60 of the motor 58 for rotation about the drive axis 62.

Figure 8:
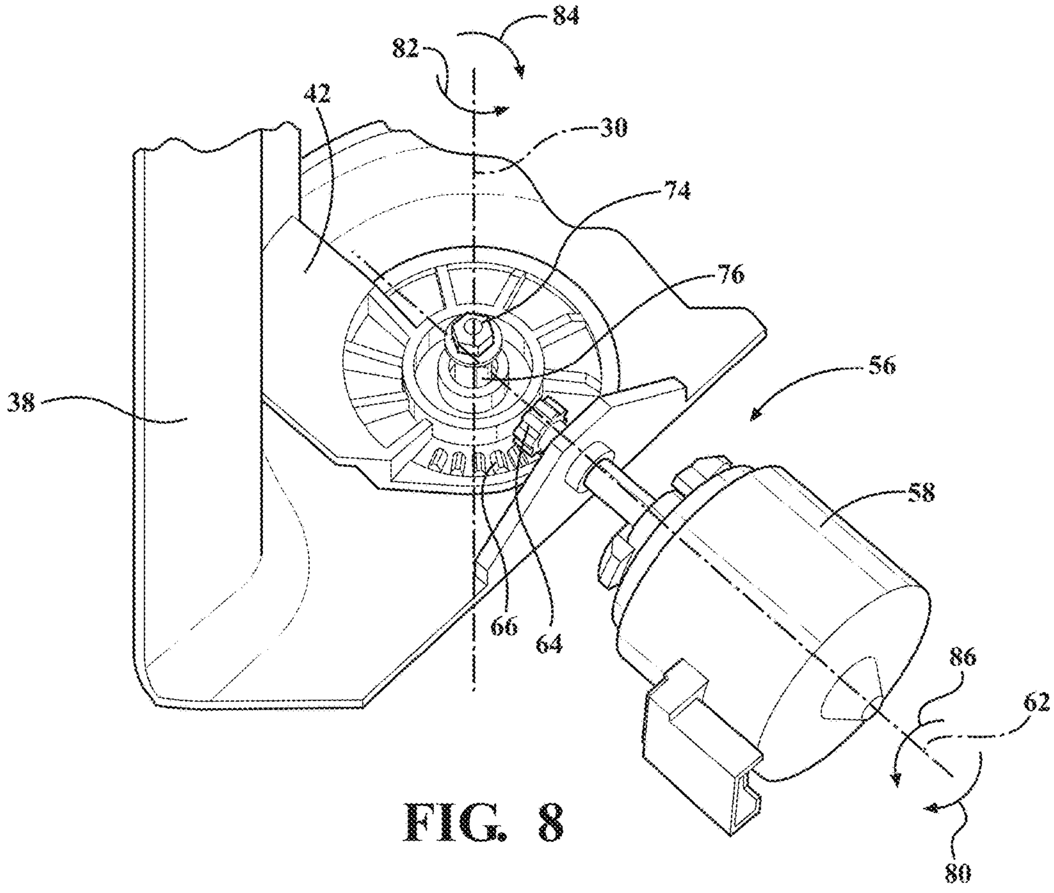
FIG. 8 is a schematic, partial perspective view of the light assembly showing a lower rack gear of the first rotating mask in meshing engagement with a drive gear of a motor.
Figure 9:
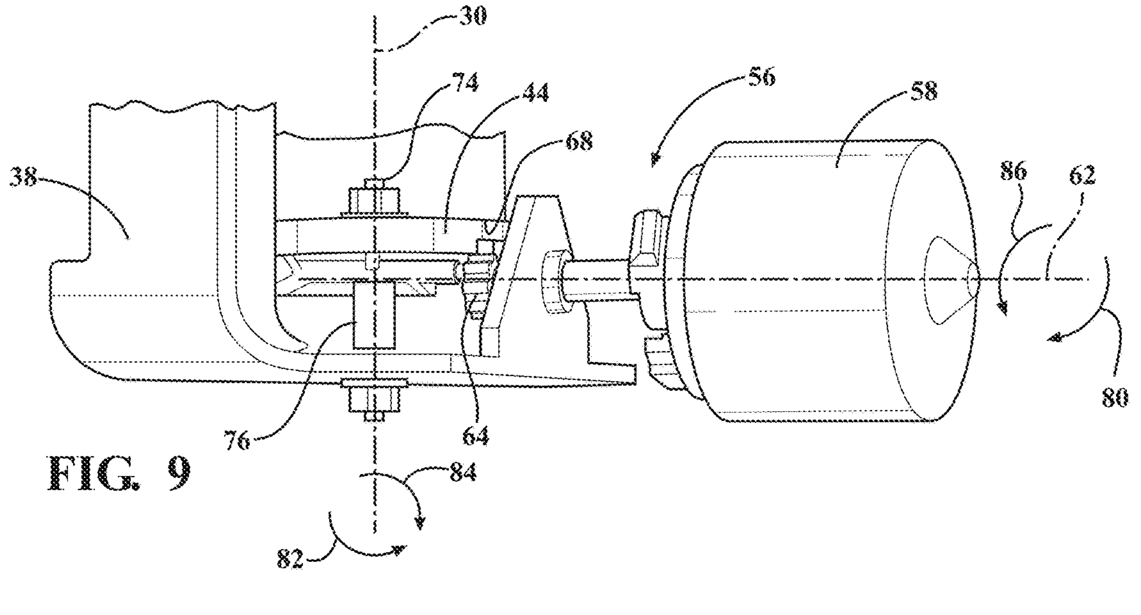
FIG. 9 is a schematic, partial perspective view of the light assembly showing an upper rack gear of the second rotating mask in meshing engagement with the drive gear of the motor.

Referring to FIG. 8, the first rotating mask 42 includes a lower gear rack 66 that is disposed in meshing engagement with the drive gear 64. It should be appreciated that FIG. 8 shows the first rotating mask 42 and the stationary bezel 38, and omits other components of the light assembly 20, such as the second rotating bevel, for clarity. Referring to FIG. 9, the second rotating mask 44 includes an upper gear rack 68 that is disposed in meshing engagement with the drive gear 64. It should be appreciated that FIG. 9 shows the second rotating mask 44 and the stationary bezel 38, and omits other components of the light assembly 20, such as the first rotating mask 42, for clarity. As best shown in FIG. 7, the upper gear rack 68 and the lower gear rack 66 are disposed opposite each other, with the drive gear 64 disposed between the upper gear rack 68 and the lower gear rack 66. Accordingly, rotation of the drive gear 64 in one direction simultaneously rotates the first rotating mask 42 and the second rotating mask 44 in opposite rotational directions about the rotation axis 30.

Referring to FIG. 7, the lower gear rack 66 and the upper gear rack 68 are each radially spaced from the rotation axis 30 a rack distance 70. Additionally, as best shown in FIGS. 8 and 9, the lower gear rack 66 and the upper gear rack 68 are each disposed in an arcuate configuration perpendicular to the rotation axis 30. As shown in FIG. 7, the wall portion 50A of the first rotating mask 42 is radially spaced from the rotation axis 30 a wall distance 72 that is greater than the rack distance 70 between the rotation axis 30 and the lower gear rack 66 of the first rotating mask 42. Similarly, the wall portion 50B of the second rotating mask 44 is radially spaced from the rotation axis 30 the wall distance 72 that is greater than the rack distance 70 between the rotation axis 30 and the upper gear rack 68 of the second rotating mask 44. This relative spacing difference increases or magnifies the circumferential distance that the wall portions 50A, 50B are moved relative to the movement of the gear racks. In other words, a small movement of the upper gear rack 68 and the lower gear rack 66 around the rotational axis provides a greater movement in the wall portions 50A, 50B of the first rotating mask 42 and the second rotating mask 44.

Figure 6:
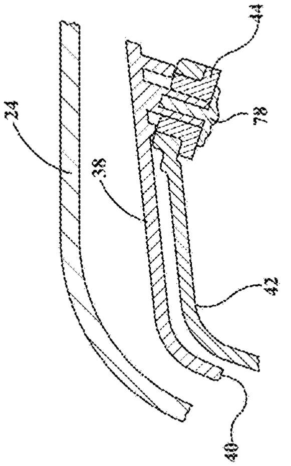
FIG. 6 is a schematic, partial cross sectional view of the light assembly.

As noted above, the first rotating mask 42 and the second rotating mask 44 are each rotatably supported for rotation about the rotation axis 30. As shown in the exemplary embodiment described herein, the first rotating mask 42 and the second rotating mask 44 are each rotatably attached to the stationary bezel 38 for rotation about the rotation axis 30. However, it should be appreciated that the first rotating mask 42 and the second rotating mask 44 may be rotatably supported for rotation about the rotation axis 30 in some other manner not shown or described herein. The first rotating mask 42 and the second rotating mask 44 may be rotatably attached to the stationary bezel 38 in any suitable manner. For example, and as shown in FIG. 7, the light assembly 20 may include a lower pin 74 that is concentric with the rotation axis 30, and interconnects the first rotating mask 42 and the second rotating mask 44 with the stationary bezel 38, to form a lower rotatable connection. A bushing 76 may be disposed between the lower pin 74 and the first rotating mask 42, and the second rotating mask 44. The lower pin 74 may include, but is not limited to, a bolt, threaded rod, or other similar device capable of securing the first rotating mask 42 and the second rotating mask 44 to each other and to the stationary bezel 38. Similarly, referring to FIG. 6, the light assembly 20 may include an upper pin 78 that is concentric with the rotation axis 30, and interconnects the first rotating mask 42 and the second rotating mask 44 with the stationary bezel 38, to form an upper rotatable connection. The upper pin 78 may include, but is not limited to, a bolt, threaded rod, push pin, or other similar device capable of securing the first rotating mask 42 and the second rotating mask 44 to each other and to the stationary bezel 38.

In operation, rotation of the drive gear 64 about the drive axis 62 in an opening rotational direction 80 rotates the first rotating mask 42 about the rotation axis 30 in a first rotational direction 82, and rotates the second rotating mask 44 about the rotation axis 30 in a second rotational direction 84. The second rotational direction 84 is opposite the first rotational direction 82. Rotation of the drive gear 64 in the opening rotational direction 80 moves the first rotating mask 42 and the second rotating mask 44 into their respective open positions. In contrast, rotation of the drive gear 64 bout the drive axis 62 in a closing rotational direction 86, opposite the opening rotational direction 80, rotates the first rotating mask 42 about the rotation axis 30 in the second rotational direction 84, and the second rotating mask 44 about the rotation axis 30 in the first rotational direction 82. Rotation of the drive gear 64 in the closing rotational direction 86 moves the first rotating mask 42 and the second rotating mask 44 into their respective closed positions.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A headlamp assembly comprising:

a carrier;

at least one light module attached to the carrier and operable to emit light;

a stationary bezel attached to the carrier, wherein the stationary bezel defines an opening through which light from the at least one light module passes;

a first rotating mask rotatably supported for rotation about a rotation axis, relative to the stationary bezel;

a second rotating mask rotatably supported for rotation about the rotation axis, relative to the stationary bezel;

a drive system coupled to the first rotating mask and the second rotating mask, wherein the drive system is operable to rotate the first rotating mask between an open position and a closed position, and the second rotating mask between an open position and a closed position;

wherein the first rotating mask and the second rotating mask are positioned clear of the opening in the stationary bezel when disposed in their respective open positions to allow light from the at least one light module through the opening, and wherein the first rotating mask and the second rotating mask are positioned in the opening of the stationary bezel to conceal the at least one light module when disposed in their respective closed positions.

2. The headlamp assembly set forth in claim 1 wherein the at least one light module includes a plurality of light modules stacked relative to each other along the rotation axis.

3. The headlamp assembly set forth in claim 1 further comprising a lower pin concentric with the rotation axis, and interconnecting the first rotating mask and the second rotating mask with the stationary bezel.

4. The headlamp assembly set forth in claim 3 further comprising an upper pin concentric with the rotation axis, and interconnecting the first rotating mask and the second rotating mask with the stationary bezel.

5. The headlamp assembly set forth in claim 1 further comprising a housing configured for attachment to a body of a vehicle, wherein the carrier is attached to and supported by the housing.

6. The headlamp assembly set forth in claim 5 further comprising a lens attached to and supported by the housing, and cooperating with the housing to define an interior region therebetween, with the stationary bezel, the first rotating mask and the second rotating mask disposed within the interior region.

7. The headlamp assembly set forth in claim 1 wherein the drive system includes a motor having an output rotatable about a drive axis, wherein the drive axis is substantially perpendicular to the rotation axis.

8. The headlamp assembly set forth in claim 7 wherein the drive system includes a drive gear attached to the output of the motor, and rotatably driven by the output of the motor for rotation about the drive axis.

9. The headlamp assembly set forth in claim 8 wherein the first rotating mask includes a lower gear rack disposed in meshing engagement with the drive gear.

10. The headlamp assembly set forth in claim 9 wherein the second rotating mask includes an upper gear rack disposed in meshing engagement with the drive gear.

11. The headlamp assembly set forth in claim 10 wherein the upper gear rack and the lower gear rack are disposed opposite each other, with the drive gear disposed between the upper gear rack and the lower gear rack.

12. The headlamp assembly set forth in claim 11 wherein the lower gear rack and the upper gear rack are each radially spaced from the rotation axis, and are each disposed in an arcuate configuration perpendicular to the rotation axis.

13. The headlamp assembly set forth in claim 11 wherein rotation of the drive gear about the drive axis in an opening rotational direction rotates the first rotating mask about the rotation axis in a first rotational direction, and rotates the second rotating mask about the rotation axis in a second rotational direction, wherein the second rotational direction is opposite the first rotational direction, to move the first rotating mask and the second rotating mask into their respective open positions, and wherein rotation of the drive gear bout the drive axis in a closing rotational direction, opposite the opening rotational direction, rotates the first rotating mask about the rotation axis in the second rotational direction, and the second rotating mask about the rotation axis in the first rotational direction to move the first rotating mask and the second rotating mask into their respective closed positions.

14. A light assembly comprising:

a carrier;

a plurality of light modules attached to the carrier and operable to emit light, wherein the plurality of light modules are stacked relative to each other along a rotation axis;

a stationary bezel attached to the carrier, wherein the stationary bezel defines an opening through which light from the plurality of light modules passes;

a first rotating mask rotatably attached to the stationary bezel for rotation about the rotation axis, relative to the stationary bezel;

a second rotating mask rotatably attached to the stationary bezel for rotation about the rotation axis, relative to the stationary bezel;

a drive system coupled to and interconnecting the first rotating mask and the second rotating mask, wherein the drive system includes a drive gear in meshing engagement with each of the first rotating mask and the second rotating mask, and operable to simultaneously rotate the first rotating mask between an open position and a closed position, and the second rotating mask between an open position and a closed position.

15. The light assembly set forth in claim 14 further comprising:

a housing configured for attachment to a body of a vehicle, wherein the carrier is attached to and supported by the housing; and a lens attached to and supported by the housing, and cooperating with the housing to define an interior region therebetween, with the stationary bezel, the first rotating mask and the second rotating mask disposed within the interior region defined between the lens and the housing.

16. The light assembly set forth in claim 14 wherein the drive system includes a motor having an output rotatable about a drive axis, wherein the drive axis is substantially perpendicular to the rotation axis.

17. The light assembly set forth in claim 16 wherein the drive gear is attached to the output of the motor, and rotatably driven by the output of the motor for rotation about the drive axis.

18. The light assembly set forth in claim 17 wherein the first rotating mask includes a lower gear rack disposed in meshing engagement with the drive gear, and wherein the second rotating mask includes an upper gear rack disposed in meshing engagement with the drive gear.

19. The light assembly set forth in claim 18 wherein the upper gear rack and the lower gear rack are disposed opposite each other, with the drive gear disposed between the upper gear rack and the lower gear rack.

20. The light assembly set forth in claim 19 wherein:

the lower gear rack and the upper gear rack are each radially spaced from the rotation axis, and are each disposed in an arcuate configuration perpendicular to the rotation axis;

wherein the first rotating mask includes a wall portion that is radially spaced from the rotation axis a distance that is greater than the radial spacing between the rotation axis and the lower gear rack of the first rotating mask; and wherein the second rotating mask includes a wall portion that is radially spaced from the rotation axis a distance that is greater than the radial spacing between the rotation axis and the upper gear rack of the second rotating mask.

* * * * *